(12) United States Patent
Fujii et al.

(10) Patent No.: US 10,178,356 B2
(45) Date of Patent: *Jan. 8, 2019

(54) MONITORING APPARATUS, AND MOVING IMAGE OUTPUT METHOD

(71) Applicant: PANASONIC INTELLECTUAL PROPERTY MANAGEMENT CO., LTD., Osaka (JP)

(72) Inventors: Hirofumi Fujii, Osaka (JP); Kazuhiko Iwai, Kanagawa (JP); Tetsurou Kakizawa, Kanagawa (JP); Kosuke Hosoi, Fukuoka (JP); Marie Kuwahara, Fukuoka (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,091

(22) Filed: May 22, 2017

(65) Prior Publication Data

US 2017/0257604 A1  Sep. 7, 2017

Related U.S. Application Data

(63) Continuation of application No. 14/613,612, filed on Feb. 4, 2015, now Pat. No. 9,693,023.

(30) Foreign Application Priority Data

Feb. 5, 2014 (JP) .................................. 2014-020514
Feb. 5, 2014 (JP) .................................. 2014-020515
Feb. 5, 2014 (JP) .................................. 2014-020519

(51) Int. Cl.
*H04N 11/02* (2006.01)
*H04N 7/18* (2006.01)
(Continued)

(52) U.S. Cl.
CPC ......... *H04N 7/183* (2013.01); *G06K 9/00369* (2013.01); *G06K 9/00771* (2013.01);
(Continued)

(58) Field of Classification Search
CPC ............... H04N 7/183; H04N 5/23216; H04N 5/23293; H04N 7/18; G06K 9/3233;
(Continued)

(56) References Cited

U.S. PATENT DOCUMENTS 8,907,985 B2   12/2014  Fujii et al.
9,165,212 B1   10/2015  Watanabe et al.
(Continued)

FOREIGN PATENT DOCUMENTS

JP    5159381 B2       10/2009
JP    2013-186838 A     9/2013
WO    2009/017687       2/2009

OTHER PUBLICATIONS

Communication pursuant to Article 94(3) EPC dated Sep. 26, 2017 for the related European Patent Application No. 15153883.2.
Search report from E.P.O., dated Jun. 29, 2015.

*Primary Examiner* — Sathyanaraya V Perungavoor
*Assistant Examiner* — Howard D Brown, Jr.
(74) *Attorney, Agent, or Firm* — Greenblum & Bernstein, P.L.C.

(57) ABSTRACT

A monitoring apparatus includes a processor, wherein the monitoring apparatus images a monitoring area and outputs a moving image of the monitoring area, and the processor detects all persons appearing in the moving image, performs mask processing of changing inner portions of outlines of all persons into translucent mask images, and superposes the mask images on a background image, to generate a mask-processed moving image, and outputs the mask-processed moving image to a browsing apparatus through a network.

5 Claims, 20 Drawing Sheets

(51) Int. Cl.
*H04N 5/232* (2006.01)
*G06Q 30/02* (2012.01)
*G06K 9/00* (2006.01)
*G06K 9/32* (2006.01)
*G06T 11/00* (2006.01)

(52) U.S. Cl.
CPC ........... *G06K 9/3233* (2013.01); *G06Q 30/02* (2013.01); *G06T 11/00* (2013.01); *H04N 5/23216* (2013.01); *H04N 5/23293* (2013.01); *H04N 7/18* (2013.01)

(58) Field of Classification Search
CPC ........... G06K 9/00771; G06K 9/00369; G06Q 30/02; G06T 11/00
See application file for complete search history.

(56) References Cited

U.S. PATENT DOCUMENTS

| | | |
|---|---|---|
| 9,558,398 B2 | 1/2017 | Iwai |
| 2002/0057840 A1 | 5/2002 | Belmares |
| 2003/0228128 A1 | 12/2003 | Taylor |
| 2004/0004626 A1* | 1/2004 | Ida ........................ G06T 11/60 345/626 |
| 2004/0265708 A1* | 12/2004 | Misaka ..................... G03F 1/26 430/5 |
| 2005/0123172 A1* | 6/2005 | Henson ........... G08B 13/19686 382/103 |
| 2006/0222213 A1 | 10/2006 | Kiyohara et al. |
| 2009/0002489 A1 | 1/2009 | Yang et al. |
| 2010/0166259 A1 | 7/2010 | Otsu |
| 2010/0225748 A1* | 9/2010 | Kawamura ........... G03B 15/02 348/51 |
| 2011/0085035 A1* | 4/2011 | Choi ..................... H04N 1/448 348/143 |
| 2011/0150327 A1* | 6/2011 | Yoo ......................... G06T 1/00 382/165 |
| 2013/0242127 A1 | 9/2013 | Kasahara et al. |
| 2013/0278774 A1 | 10/2013 | Fujimatsu et al. |
| 2015/0015718 A1 | 1/2015 | Fujimatsu et al. |
| 2015/0187088 A1 | 7/2015 | Iwai et al. |
| 2015/0244991 A1 | 8/2015 | Noda |

* cited by examiner

| GENDER | AGE | MASK IMAGE |
|---|---|---|
| MALE | ALL GENERATIONS | |
| FEMALE | ALL GENERATIONS | |

FIG. 16C
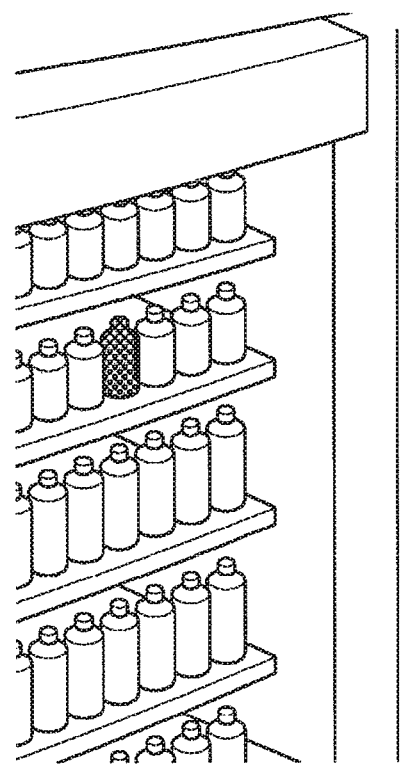

MONITORING APPARATUS, AND MOVING IMAGE OUTPUT METHOD

CROSS REFERENCE TO RELATED APPLICATIONS

This is a continuation application of U.S. patent application Ser. No. 14/613,612, filed Feb. 4, 2015, which claims the benefit of Japanese Patent Application No. 2014-020514, filed on Feb. 5, 2014, Japanese Patent Application No. 2014-020515, filed on Feb. 5, 2014, and Japanese Patent Application No. 2014-020519, filed on Feb. 5, 2014. The entire disclosure of each of the above-identified applications, including the specification, drawings, and claims, is incorporated herein by reference in its entirety.

TECHNICAL FIELD

The present invention relates to a monitoring apparatus, and a moving image output method that generate and output an output moving image obtained by changing an image area of a person detected from an imaged moving image of a monitoring area to a mask image.

BACKGROUND OF THE INVENTION

A monitoring system of installing a camera which images the inside of the store and monitoring a person in the store through a moving image of the camera is widely used in a store such as a convenience store, but in a case of using the imaged moving image for a purpose other than the monitoring, that is, for a purpose of marketing analysis or service improvement, it is necessary to protect privacy of customers.

Meanwhile, Japanese Patent Unexamined Publication No. 2013-186838 discloses a technology of displaying feature points on an image obtained by changing the entire person area in each image of a moving image captured by a camera to an image covered with a predetermined color, and grasping how the person moves. Japanese Patent No. 5159381 discloses a technology of generating a background image having no foreground image of a person, performing mask processing or filter processing with partial or entire translucency to foreground image, and generating an image where a face or a figure of a person is hardly specified.

In order to grasp the action of the person from the moving image, to watching the person while distinguishing the person from the background is unavoidable, but as the technologies in the related art, the image area of the person is replaced with the specific image to easily discriminate between the background and the person, and accordingly, it is easy to grasp the action of the person.

Meanwhile, it is desired to grasp what kind of tendency the action of the person, but in the technologies in the related art, there are no concerns about such a demand, and it is difficult to efficiently perform an operation of grasping the action tendency of the person.

SUMMARY OF THE INVENTION

A monitoring apparatus includes a processor, wherein the monitoring apparatus images a monitoring area and outputs a moving image of the monitoring area, and the processor detects all persons appearing in the moving image, performs mask processing of changing inner portions of outlines of all persons into translucent mask images, and superposes the mask images on a background image, to generate a mask-processed moving image, and outputs the mask-processed moving image to a browsing apparatus through a network.

BRIEF DESCRIPTION OF DRAWINGS

FIGS. 16A, 16B, and 16C are explanatory diagrams showing main parts of moving image display part 48 of a monitoring screen.

DETAILED DESCRIPTION OF THE PREFERRED EMBODIMENTS

The invention is proposed to solve problems of technologies in the related art, and a main object thereof is to provide a monitoring apparatus, a monitoring system, and a monitoring method which can make a user efficiently perform an operation of grasping an action tendency of a person.

According to a first aspect of the invention, there is provided a monitoring apparatus includes a processor, wherein the monitoring apparatus images a monitoring area and outputs a moving image of the monitoring area, and the processor detects all persons appearing in the moving image, performs mask processing of changing inner portions of outlines of all persons into translucent mask images, and superposes the mask images on a background image, to generate a mask-processed moving image, and outputs the mask-processed moving image to a browsing apparatus through a network.

According to a second aspect of the invention, the processor reproduces any moving image of the mask-processed moving image and the normal moving image which is not subjected to the mask processing, in accordance with a playback mode of the moving image set in the browsing apparatus.

According to a third aspect of the invention, the processor changes at least one of display elements of the mask image, such as a color, shading, a pattern, and an outline.

According to a fourth aspect of the invention, there is provided a moving image output method using a monitoring apparatus which images a monitoring area, performs a processing of a moving image of the monitoring area, and outputs the processed moving image, the method includes detecting all persons appearing in the moving image, performing mask processing of changing inner portions of outlines of all persons into translucent mask images, and superposing the mask images on a background image, to generate a mask-processed moving image; and outputting the mask-processed moving image to a browsing apparatus through a network.

Hereinafter, the embodiments of the invention will be described with reference to the drawings.

First Exemplary Embodiment

Figure 1:
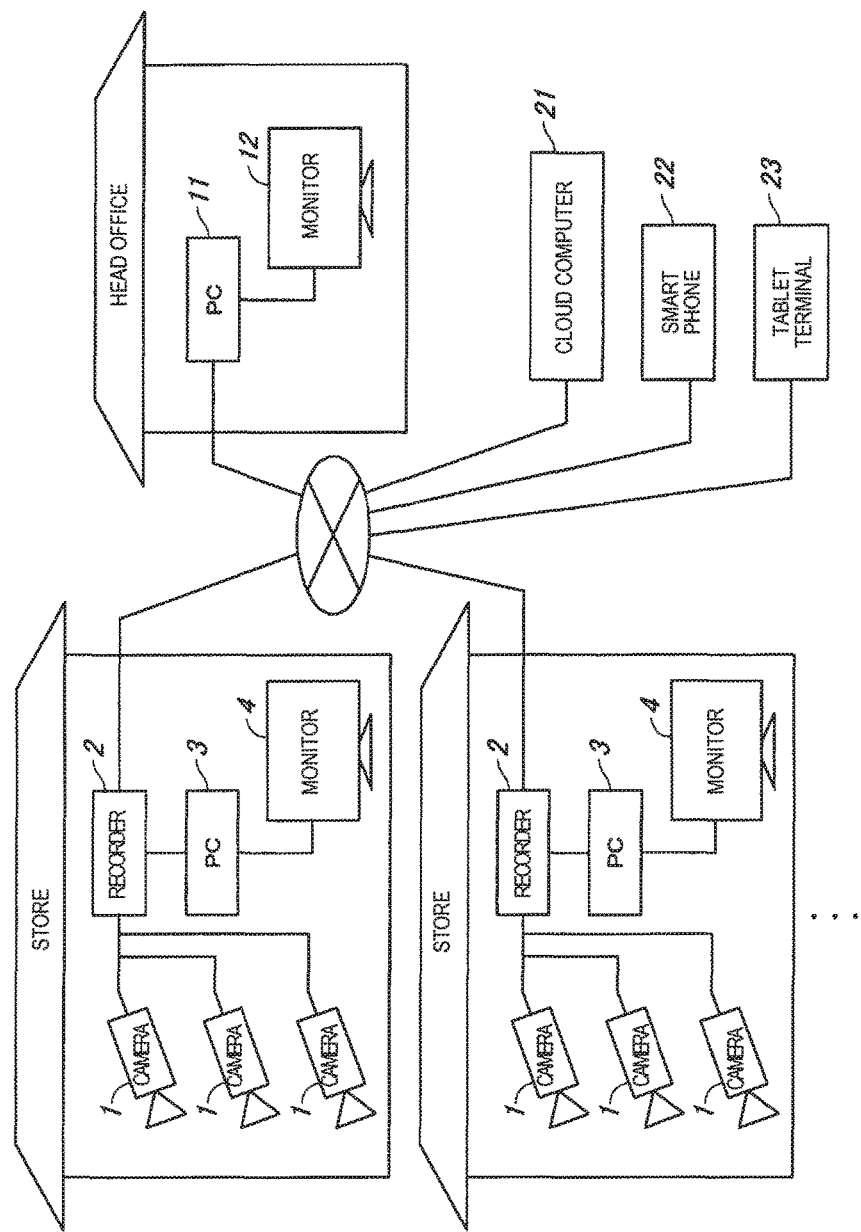
FIG. 1 is an overall configuration diagram of a monitoring system according to a first exemplary embodiment.

FIG. 1 is an overall configuration diagram of a monitoring system according to a first exemplary embodiment. This monitoring system is built for a chain of retail stores such as convenience stores, and includes camera (imaging apparatus) 1, recorder (image recording apparatus) 2, PC (monitoring apparatus) 3, monitor (display apparatus) 4, which are provided in a plurality of stores, and PC 11 and monitor 12 which are provided in a head office which generally manages the plurality of stores.

Cameras 1 are installed in appropriate places in the store, the inside of the store is imaged by cameras 1, and image information obtained is recorded in recorder 2. In PC 3 installed in the store or PC 11 installed in the head office, it is possible to browse the image of the inside of the store imaged by cameras 1 in real time, it is possible to browse the image of the inside of the store in the past recorded in recorder 2, and therefore, it is possible to check the situation in the store, in the store or in the head office.

PC 3 installed in the store is configured as a monitoring apparatus which monitors the state of the person or the product in the store. It is possible to browse monitoring information generated by PC 3 in PC 3, and it is also possible to browse the monitoring information in PC 11 by transmitting the monitoring information to PC 11 installed in the head office. PC 3 and PC 11 are configured as a browsing apparatus which browses monitoring information. PC 3 and PC 11 include a processor (CPU) and a program memory. The CPU of PC 3 is realized by executing programs (instructions) for monitoring. The programs may be introduced to PC 3 as an information processing apparatus in advance to configure the PC as a dedicated apparatus, or may be supplied to a user by being recorded in a suitable program recording medium as an application program to be operated on a general-use OS, or through a network.

Figure 2:
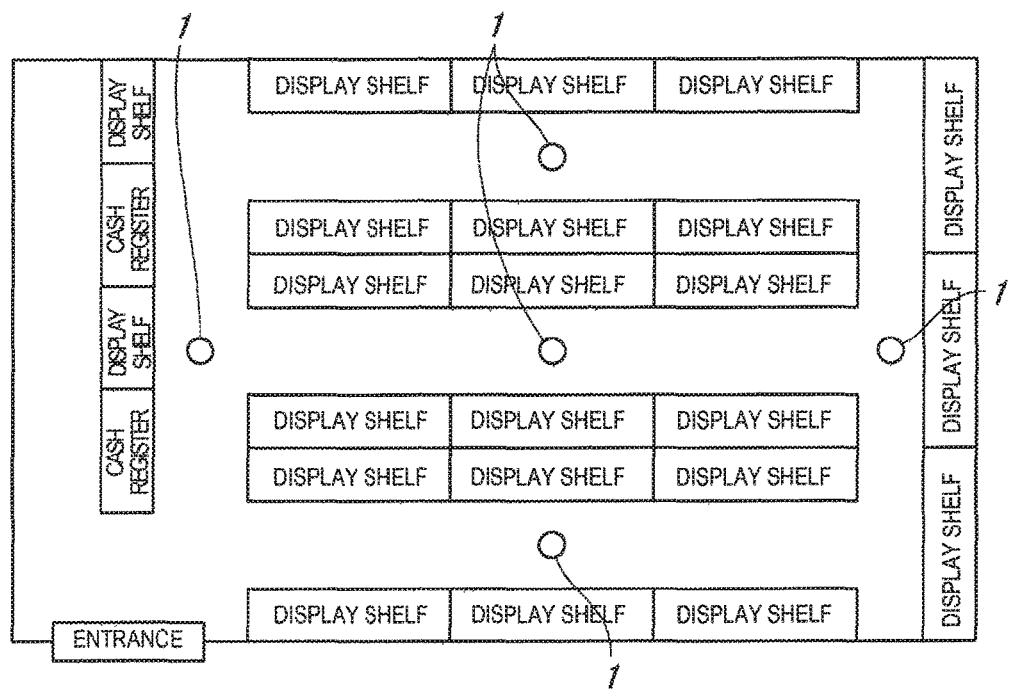
FIG. 2 is a plan view of a store illustrating a layout of the store and an installation situation of cameras 1.

Next, a layout of the store and an installation state of cameras 1 will be described using a convenience store as an example. FIG. 2 is a plan view of a store illustrating the layout of the store and the installation state of cameras 1.

In the store, an entrance, display shelves (display areas), and cash registers are provided. The display shelves are installed to be divided into types of products such as a lunch box, a PET bottle, onigiri, and the like. A display shelf for fast food is installed next to the cash registers.

A customer enters the store from the entrance, moves in the store through passages between the display shelves, heads for the cash register with a product when a desired product is found, makes a payment at the cash register, and exits the store from the entrance.

The plurality of cameras 1 which image the inside of the store (monitoring area) are installed in the store. Particularly, in the example shown in FIG. 2, an omnidirectional camera including an imaging range at 360 degrees using a fisheye lens is employed as camera 1, and it is possible to image the products displayed on the display shelves and to image the person staying in front of the display shelves or the cash registers by camera 1.

Figure 3:
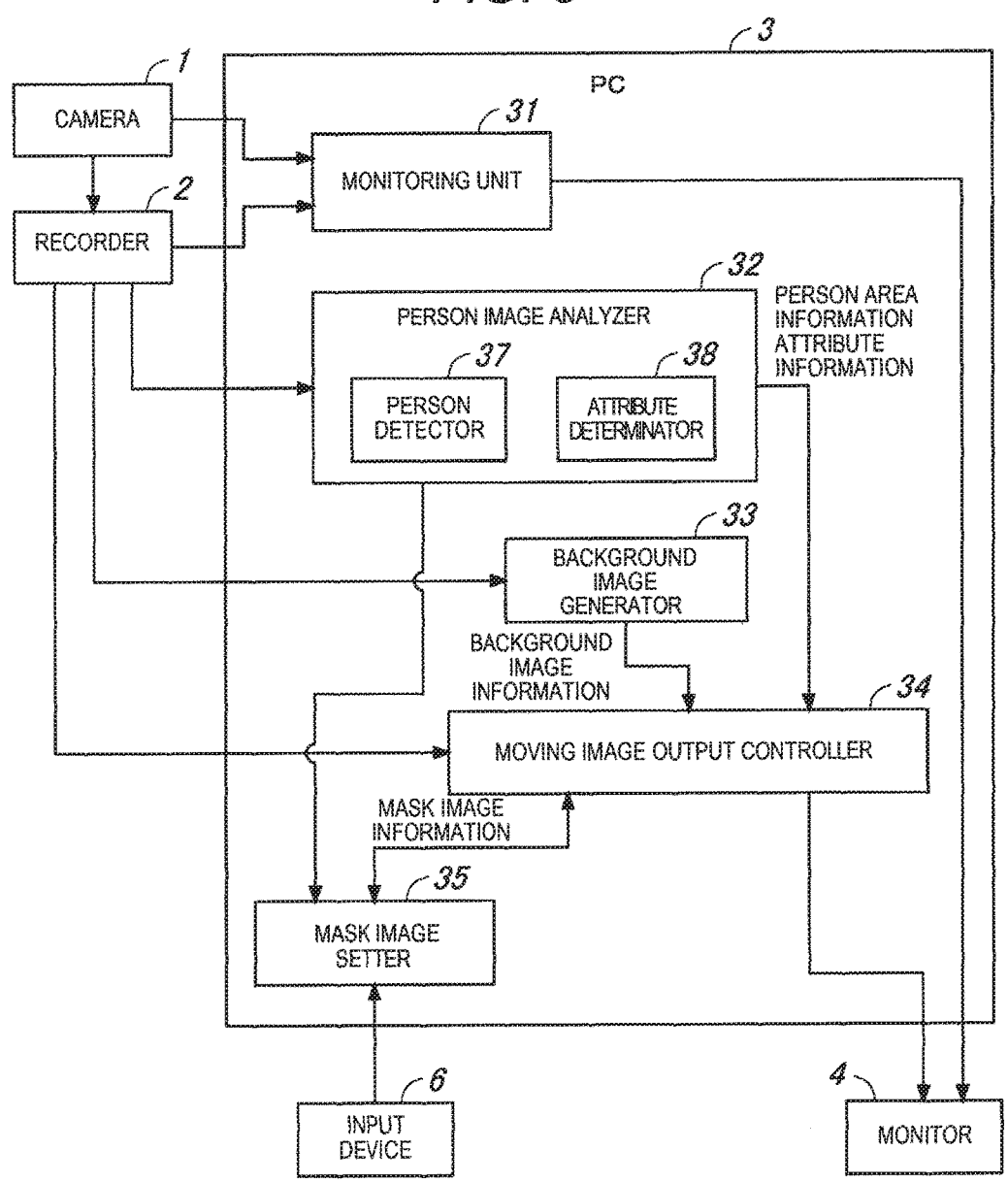
FIG. 3 is a functional block diagram showing a schematic configuration of PC 3.

Next, the process performed by PC 3 shown in FIG. 1 will be described with based on a functional block diagram. FIG. 3 is a functional block diagram showing a schematic configuration of PC 3.

PC 3 includes a monitoring unit 31. Monitoring unit 31 causes PC 3 to function as a monitoring system which monitors the inside of the store. Monitoring unit 31 can control the operations of cameras 1 and recorder 2, can browse the image of the inside of the store imaged by cameras 1 in real time, and can browse the image of the inside of the store recorded by recorder 2.

PC 3 includes person image analyzer 32, background image generator 33, moving image output controller 34, and mask image setter 35.

Person image analyzer 32 analyzes a moving image imaged by camera 1 and acquires information regarding the person, and includes person detector 37 and attribute determinator 38.

Person detector 37 performs a process of detecting the person from the imaged moving image and acquiring area information for each person (positional information regarding an image area of a person). Attribute determinator 38 performs a process of determining attribute (gender, age, and the like) for each person detected from the imaged moving image. For the processes performed by person detector 37 and attribute determinator 38, a well-known image recognition technology may be used. It is desired to perform a person tracking process of correlating person detection results for each frame of the imaged moving image by person image analyzer 32, and therefore, it is possible to perform attribute determination with high accuracy.

Mask image setter 35 performs a process of setting a mask image by attribute. Particularly, in the embodiment, a process of setting a mask image by attribute is performed according to an input operation by a user for selecting a mask image for each attribute of the person. The mask image by attribute may be set in advance.

Background image generator 33 performs a process of generating a background image from the imaged moving image. This background image is obtained by removing the image of the person (foreground image) from the imaged moving image. Each image of the person from the plurality of moving images recently imaged may be removed and the background image may be synthesized from the plurality of images. The imaged moving image when there are no persons, for example, the moving image imaged before opening the store, may be prepared in advance as the background image.

Moving image output controller 34 performs a process of generating and outputting an output moving image obtained by changing the image area of the person to a mask image, based on the area information and attribute for each person output by person image analyzer 32. In the embodiment, a process of generating a mask image having an outline corresponding to the image area of the person in the imaged moving image and superposing the mask image on the background image generated by background image generator 33 is performed.

The mask image is set for a user to discriminate the attribute by changing at least any of display elements such as a color, shading, a pattern (design), and an outline, according to the attribute. Particularly, in the embodiment, the outline of the image area of the person is generated from the area information regarding each person (positional information regarding the image area of the person) and the inside of the outline is covered with a translucent image. The outline may be set not to be displayed or the outline may be displayed to be discriminated from the covered area by changing a color or shading.

Figure 4:
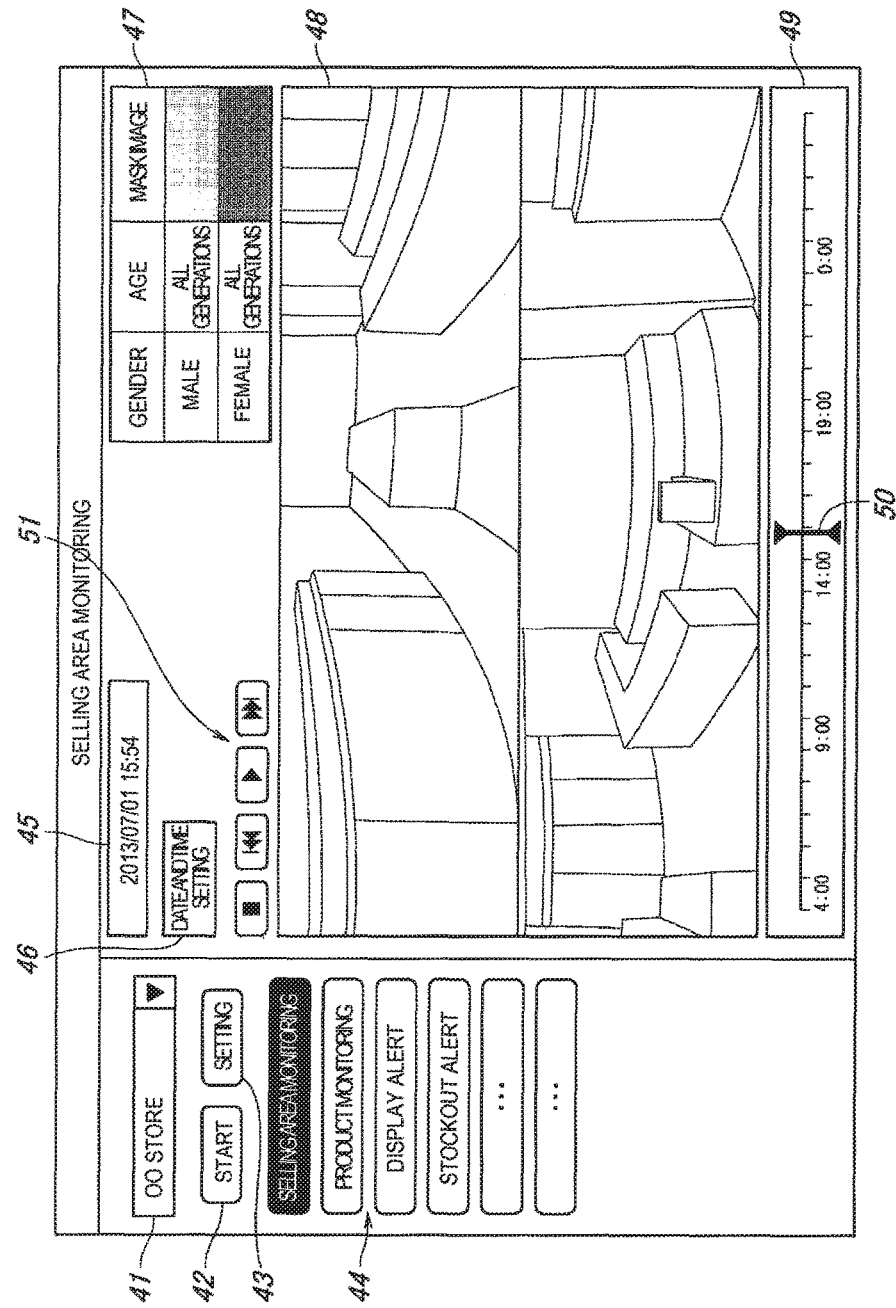
FIG. 4 is an explanatory diagram showing a monitoring screen displayed on monitor 4.

Next, a monitoring screen displayed on monitor 4 shown in FIG. 1 will be described. FIG. 4 is an explanatory diagram showing the monitoring screen displayed on monitor 4.

This monitoring screen is provided for a user to check the situation in the store for a purpose of marketing analysis or service improvement, and the monitoring screen is provided with store selection part 41, start button 42, setting button 43, operation mode selection part 44, date and time display part 45, date and time setting button 46, explanatory note display part 47, moving image display part 48, and display time point operation part 49.

A user selects the store from a pull-down menu in store selection part 41. Start button 42 starts the monitoring process by the PC. Setting button 43 sets various conditions in the monitoring process, and in the embodiment, when setting button 43 is operated, a mask image setting screen (see FIG. 5) is displayed as a pop-up. Operation mode selection part 44 selects an operation mode. Operation modes such as selling area monitoring, product monitoring, display alert, and stockout alert are prepared, and the selling area monitoring is selected herein.

Date and time display part 45 displays date and time. Date and time setting button 46 sets the date and time. When date and time setting button 46 is operated, a date and time setting screen (not shown) is displayed, and by selecting the date and time herein, the selected date and time is displayed on date and time display part 45, and the moving image on the selected date and time is displayed on moving image display part 48.

Explanatory note display part 47 explains the mask image displayed on moving image display part 48. In the embodiment, the mask image set by the attribute of the person (gender, age, and the like) is displayed on explanatory note display part 47. In the example shown in FIG. 4, the age is set as all generations, but in a case where the mask image is set for each generation of the teenagers to sixties, for example, the mask image of each generation is displayed on explanatory note display part 47.

The moving image (video) of the store is displayed on moving image display part 48. Particularly, in the example shown in FIG. 4, two panoramic moving images of the moving image imaged by camera 1 which is the omnidirectional camera, are displayed. The entire store is shown in the two moving images, and it is possible to check the situation of the entire store. In moving image display part 48, the moving image imaged by camera 1 is displayed as it is in a normal playback mode, and the moving image obtained by changing the image area of the person to the mask image is displayed in a mask playback mode. The moving image displayed on moving image display part 48 will be described later in detail.

Display time point operation part 49 adjusts the time point of the moving image displayed on moving image display part 48. By operating display time point operation part 49, it is possible to replace the moving image with a moving image on the desired time point. Specifically, when slider 50 is moved using input device 6 such as a mouse, the moving image at the time point indicated by slider 50 is displayed on moving image display part 48. Accordingly, it is possible to check the situation of the store on the desired time point with the moving image on moving image display part 48. When playing the moving image of moving image display part 48, it is possible to set normal playback, fast-forward playback, or rewind playback by using operation button 51. In this case, even when playing the moving image recorded for a long time in the mask playback mode, it is possible to efficiently check the moving image.

Figure 5:
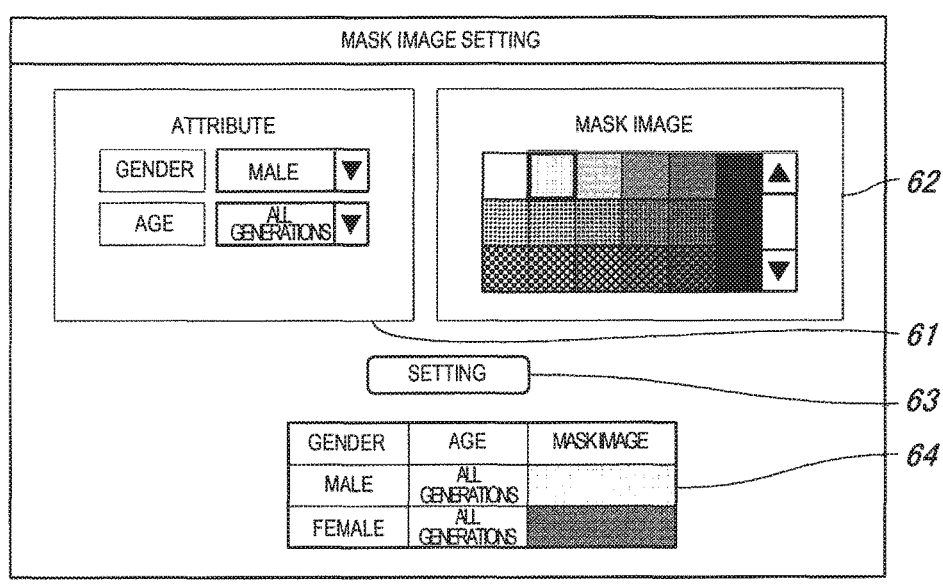
FIG. 5 is an explanatory diagram showing a mask image setting screen displayed on monitor 4.

Next, the operation of setting the mask image by attribute will be described. FIG. 5 is an explanatory diagram showing a mask image setting screen displayed on monitor 4.

The mask image setting screen is provided for a user to designate the mask image for each attribute of the person, and the mask image setting screen is provided with person attribute selection part 61, mask image selection part 62, setting button 63, and set contents display part 64.

A user selects the attribute of the person (gender, age, and the like) from a pull-down menu in person attribute selection part 61. It is possible to select any one of generations from teenagers to sixties and all generations, for example, in person attribute selection part 61. The attribute of the person may be set as adults and children. A user selects from a title menu the mask image corresponding to the attribute selected in person attribute selection part 61, in mask image selection part 62.

When the attribute of the person and the mask image corresponding thereto are selected in person attribute selection part 61 and mask image selection part 62, and setting button 63 is operated, the set contents, that is, the mask images by attribute, are displayed in set contents display part 64. In the example shown in FIG. 5, the mask images for male and female are set by setting the age as all generations.

Figure 6A:
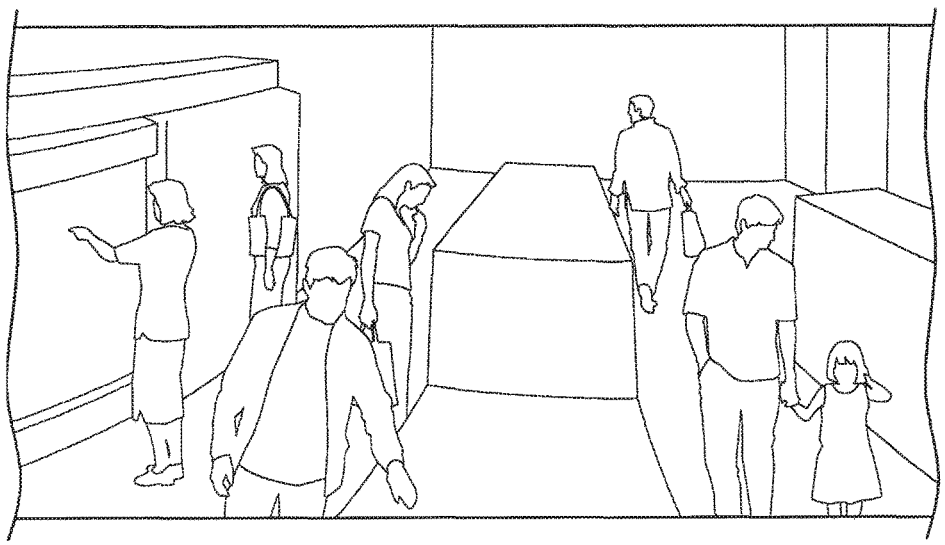
FIGS. 6A and 6B are explanatory diagrams showing main parts of moving images displayed on moving image display part 48 of a monitoring screen.
Figure 6B:
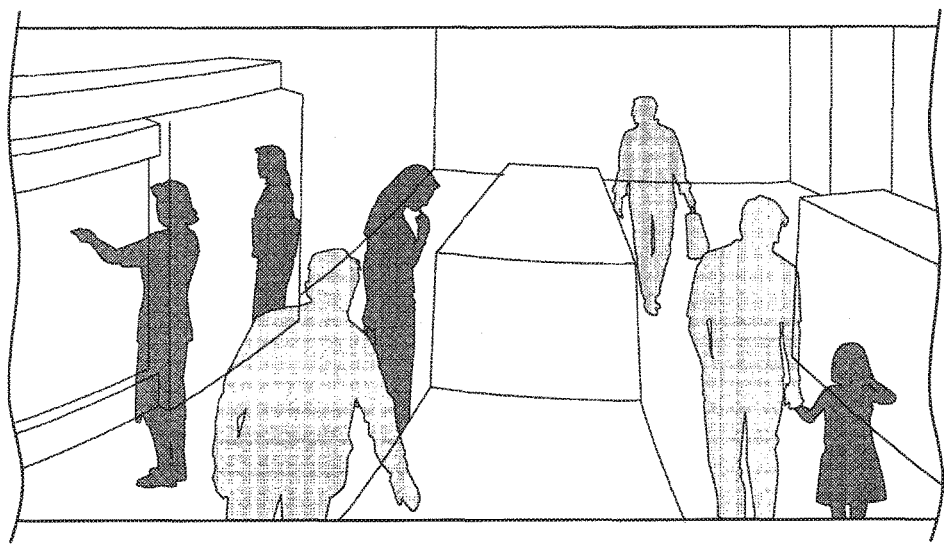

Next, the moving image displayed on moving image display part 48 of the monitoring screen shown in FIG. 4 will be described. FIGS. 6A and 6B are explanatory diagrams showing main parts of the moving image displayed on moving image display part 48 of the monitoring screen shown in FIG. 4.

As shown in FIG. 6A, the moving image imaged by camera 1 is displayed as it is in the normal playback mode. In contrast, as shown in FIG. 6B, the moving image obtained by changing the image area of the person to the mask image is displayed in the mask playback mode after performing the mask image setting. In this moving image, the image area of the person in the imaged moving image of FIG. 6A is replaced with the mask image by attributes (male and female, herein). Since the mask image has translucency, the background image is visible through the mask image.

When playing the imaged moving image, it is preferable to display an icon for play mode discrimination to be superposed with the moving image, so that a user can discriminate in which playback mode the moving image is played. It is also possible to discriminate the playback mode by displaying a color of the moving image display frame in the mask playback mode and a color of the moving image display frame in the normal playback mode, with different colors.

In the first exemplary embodiment as described above, since the mask images by attribute, for example, male and female, are displayed, it is possible to simply grasp the attribute of the person appearing on the moving image, and therefore, it is possible to efficiently perform the operation of grasping the action tendency of the person for each attribute of the person.

The gender and the age have been described as the examples of the attribute of the person, but various attributes such as a direction of a person, the race, adults/children, and a type (female office worker or male office worker) can be set as the attributes obtained by using a well-known person recognition technology. Particularly, when using the attribute of the direction of the person, it is possible to grasp a taste of each person with respect to the product in the mask playback mode.

Second Exemplary Embodiment

Next, a second exemplary embodiment will be described. The points not particularly stated herein are the same as in the first exemplary embodiment.

Figure 7:
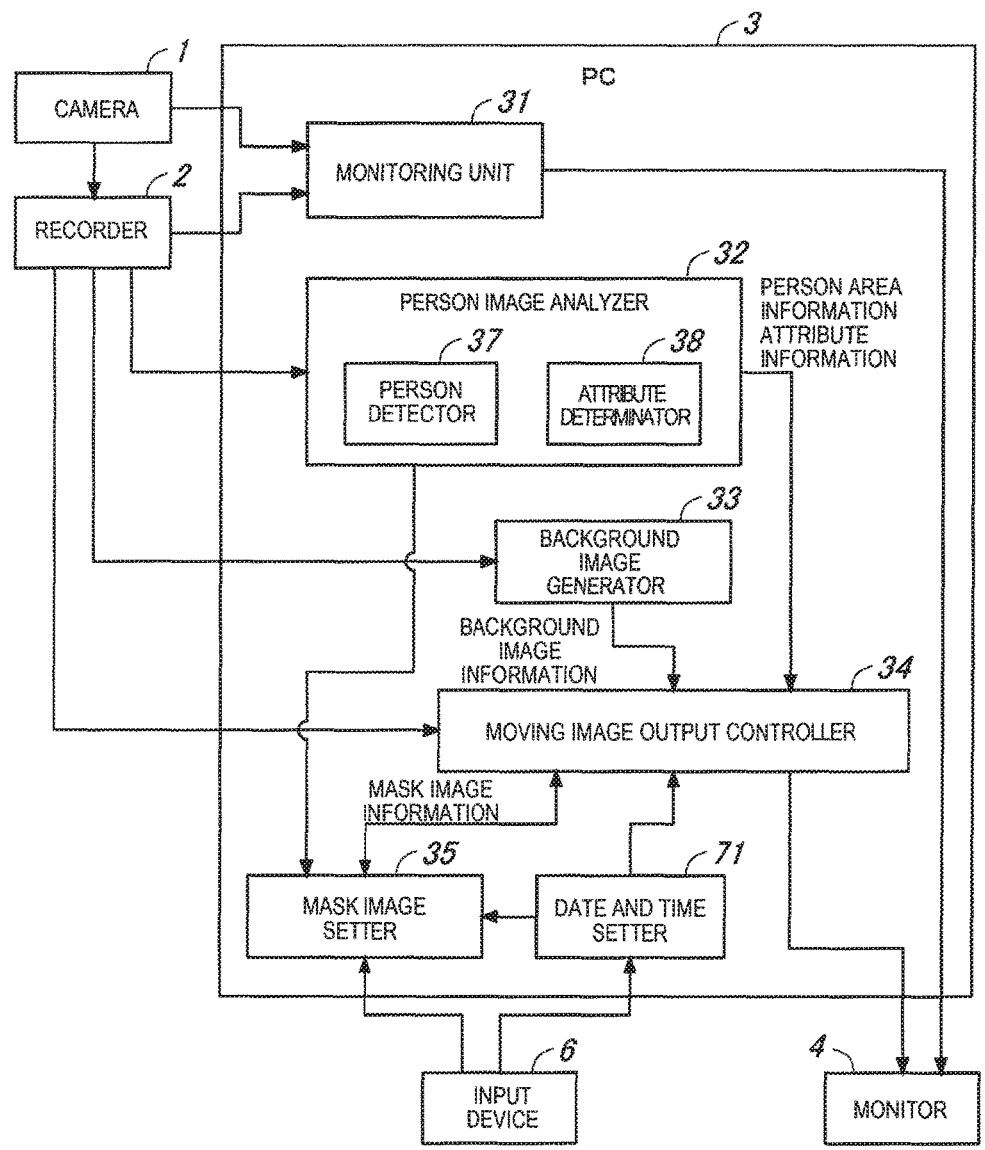
FIG. 7 is a functional block diagram showing a schematic configuration of PC 3 of a monitoring system according to a second exemplary embodiment.

FIG. 7 is a functional block diagram showing a schematic configuration of PC 3 of the monitoring system according to the second exemplary embodiment. In the second exemplary embodiment, in the same manner as in the first exemplary embodiment, PC 3 includes monitoring unit 31, person image analyzer 32, background image generator 33, moving image output controller 34, and mask image setter 35, and PC 3 in the second exemplary embodiment further includes date and time setter 71.

In the second exemplary embodiment, in the same manner as in the first exemplary embodiment, it is possible to display the mask image by the attribute of the person (gender, age, and the like), but it is also possible to display the mask image by date and time. It is also possible to have a configuration of displaying only the mask image by date and time, without displaying the mask image by the attribute of the person.

Date and time setter 71 performs a process of setting the plurality of dates and times according to the input operation by a user of designating the imaging date and time. Mask image setter 35 performs a process of setting a mask image by the imaging date and time and by the attribute of the person, according to the input operation by a user of selecting the mask image by the imaging date and time and by the attribute of the person. Person image analyzer 32 performs a process of acquiring the imaged moving image on the plurality of dates and times set by date and time setter 71 and acquiring the person area information for each person (positional information regarding the image area of the person) by the imaging date and time.

Moving image output controller 34 performs a process of generating and outputting an output moving image obtained by changing the image area of the person by the plurality of imaging dates and times to a mask image by the imaging date and time and by the attribute of the person, based on the area information regarding each person output from person image analyzer 32, and the output images are the mask images for each person on the plurality of dates and times which are displayed so as to discriminate the imaging dates and times and the attribute of the person on one background image.

In the second exemplary embodiment, the mask image is set for a user to discriminate the attribute and the imaging dates and times by changing at least any of display elements such as a color, shading, a pattern, and an outline, according to the attribute and the imaging date and time. Particularly, in the embodiment, the inside of the outline of the image area of the person is covered with a translucent image.

Figure 8:
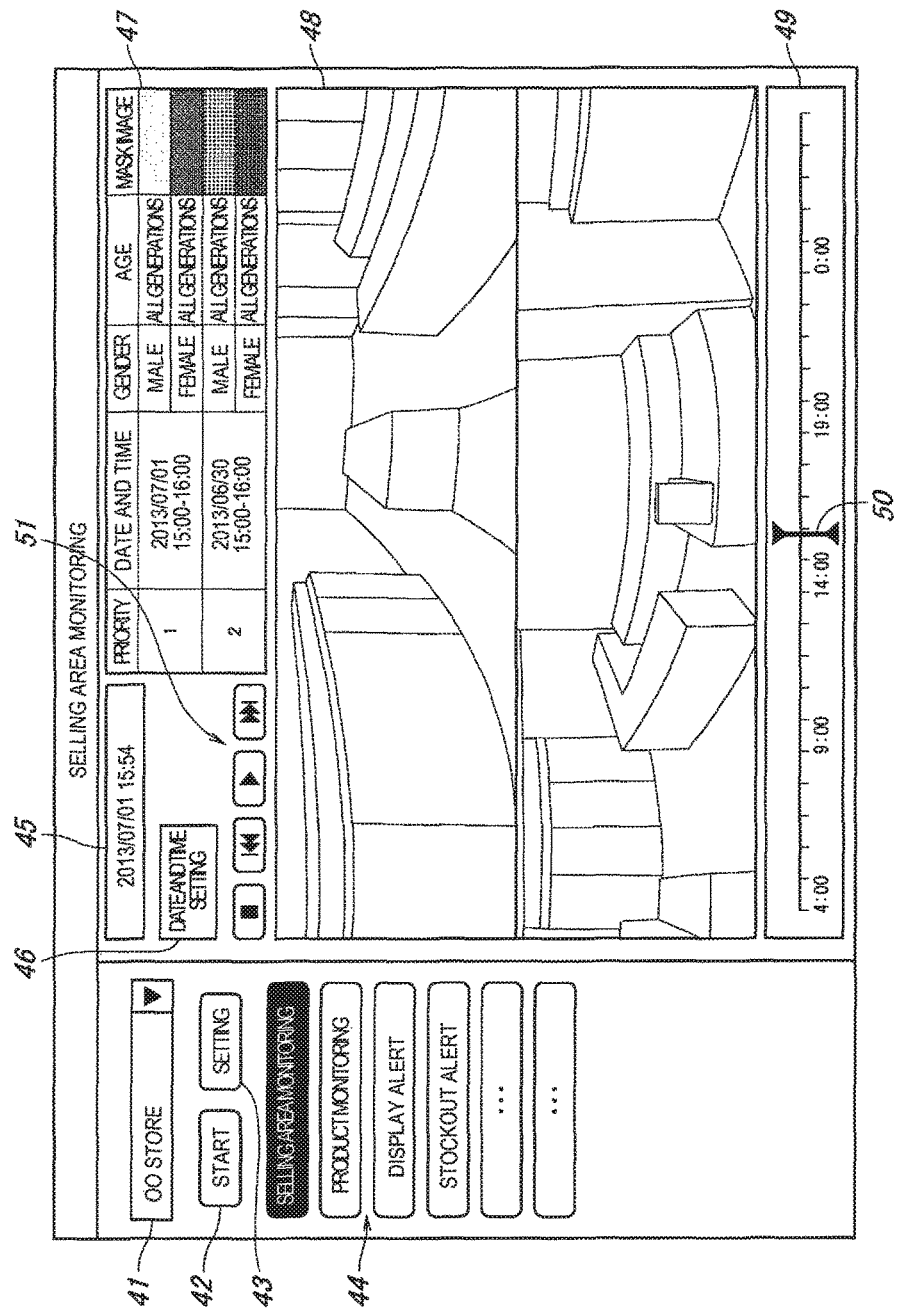
FIG. 8 is an explanatory diagram showing a monitoring screen displayed on monitor 4.

Next, a monitoring screen displayed on monitor 4 will be described. FIG. 8 is an explanatory diagram showing the monitoring screen displayed on monitor 4.

Even in the second exemplary embodiment, a monitoring screen having a configuration approximately similar to that of the first exemplary embodiment (see FIG. 4) is displayed on monitor 4, and in the monitoring screen, a mask image set by the plurality of imaging dates and times and by the attribute of the person is displayed on explanatory note display part 47.

Figure 9:
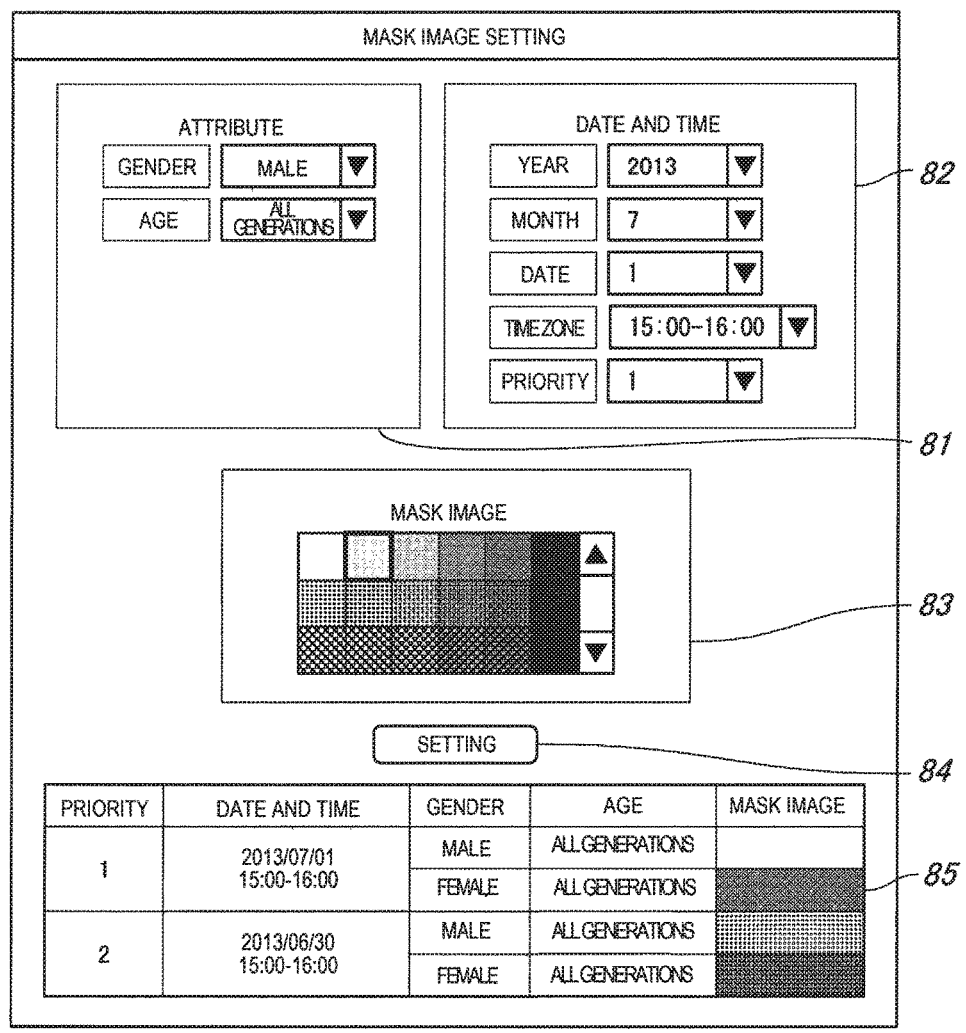
FIG. 9 is an explanatory diagram showing a mask image setting screen displayed on monitor 4.

Next, the operation of setting the mask image by the attribute and the imaging dates and times will be described. FIG. 9 is an explanatory diagram showing a mask image setting screen displayed on monitor 4.

The mask image setting screen is provided for a user to designate the mask image for each attribute of the person and for each imaging dates and times, and the mask image setting screen is provided with person attribute selection part 81, date and time selection part 82, mask image selection part 83, setting button 84, and setting contents display part 85.

A user selects the attribute of the person (gender, age, and the like) from a pull-down menu in person attribute selection part 81. A user selects the date and time (year, month, date, and time zone) from a pull-down menu in date and time selection part 82. A user selects the order of priority from a pull-down menu in date and time selection part 82. A user selects the mask image corresponding to the attribute selected in person attribute selection part 81 and the imaging date and time selected in date and time selection part 82, from a title menu in mask image selection part 83.

When the attribute of the person, the imaging date and time, and the mask image corresponding thereto are selected in person attribute selection part 81, date and time selection part 82, and mask image selection part 83, and setting button 84 is operated, the set contents, that is, the mask images by attribute and by imaging date and time are displayed in set contents display part 85. This setting operation is at least performed twice, and the mask images are set on the plurality of imaging dates and times. In the example shown in FIG. 9, the same time zones on different dates are set as two imaging dates and times.

Figure 10A:
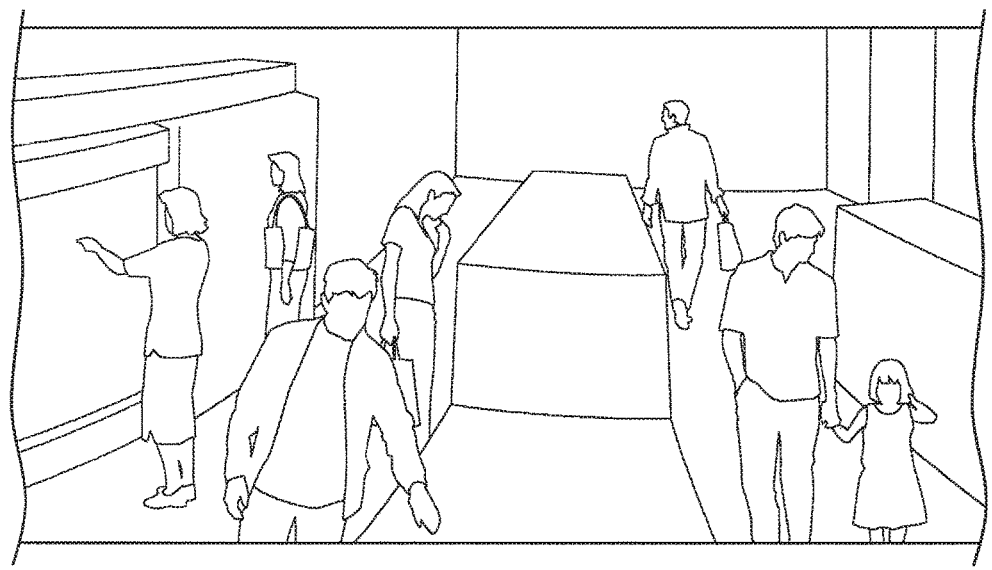
FIGS. 10A and 10B are explanatory diagrams showing moving images on two imaging dates and times.
Figure 10B:
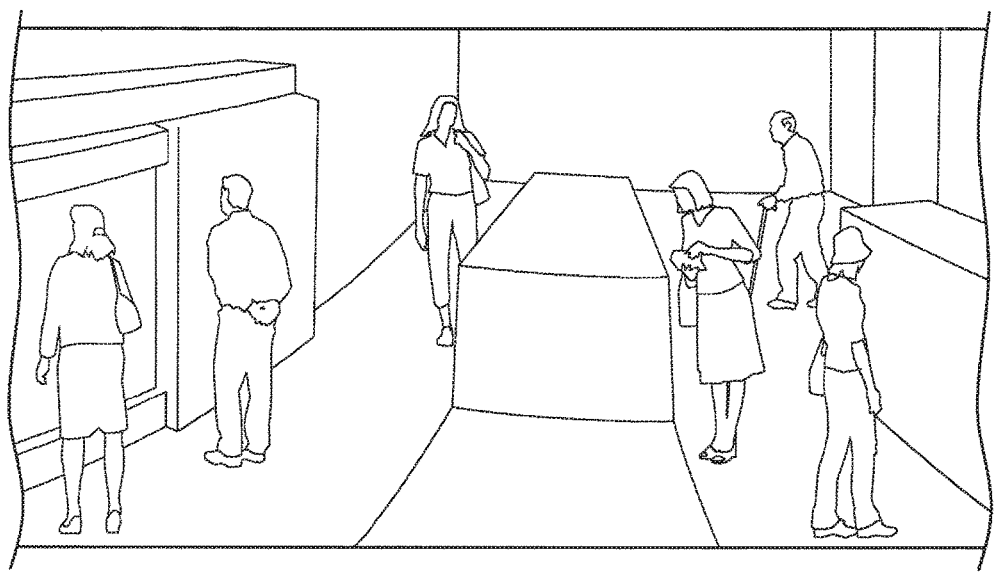
Figure 11A:
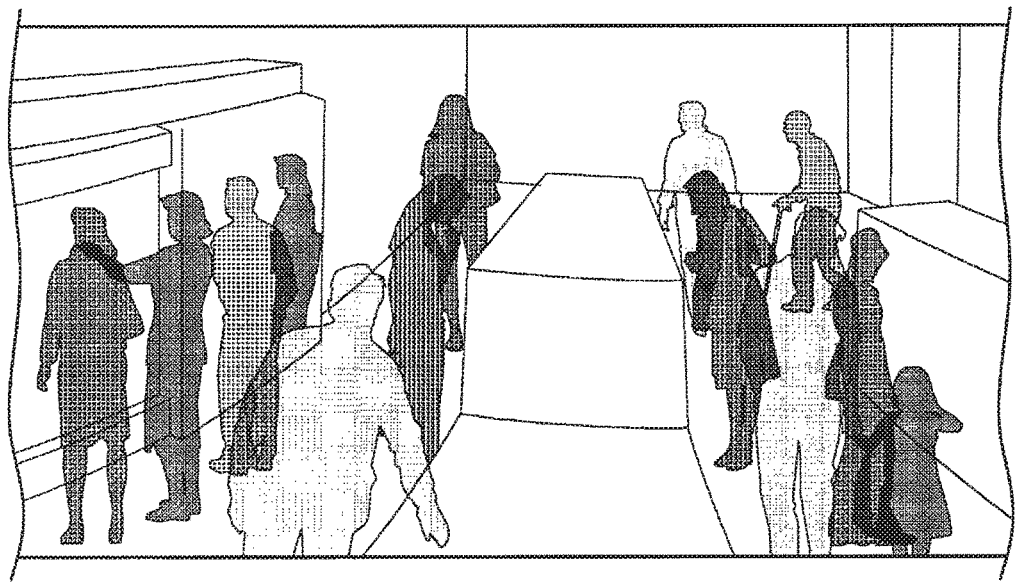
FIGS. 11A and 11B are explanatory diagrams showing main parts of moving image display part 48 of a monitoring screen.
Figure 11B:
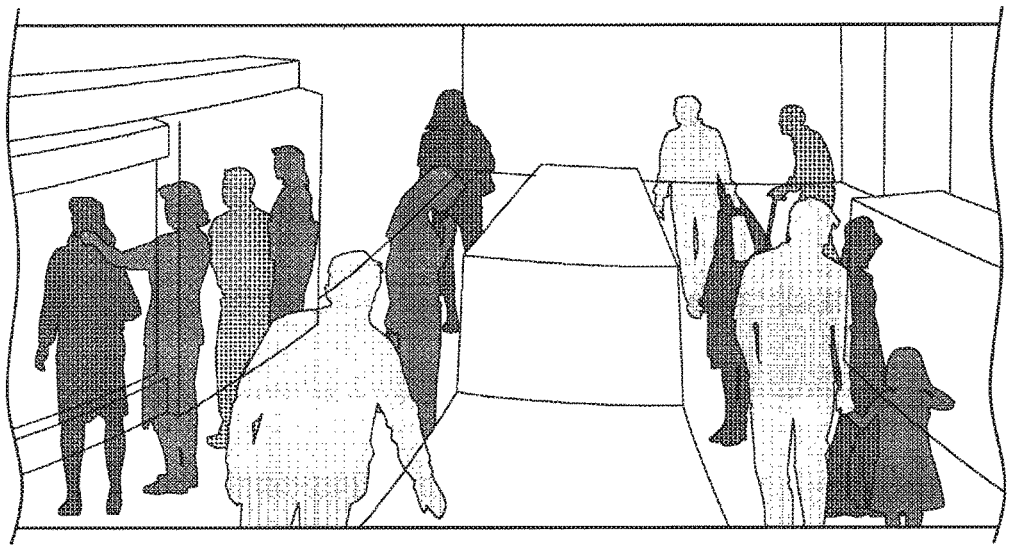

Next, the outline of the process performed by moving image output controller 34 and the moving image displayed on moving image display part 48 of the monitoring screen will be described. FIGS. 10A and 10B are explanatory diagrams showing a moving image on two imaging dates and times. FIGS. 11A and 11B are explanatory diagrams showing main parts of moving image display part 48 of the monitoring screen shown in FIG. 8.

FIG. 10A shows an imaged moving image on a first imaging date and time. FIG. 10B shows imaged moving image on a second imaging date and time. Moving image output controller 34 performs a process of generating a mask image having an outline corresponding to an image area of a person in the imaged moving image on the first imaging date and time, generating a mask image having an outline corresponding to an image area of a person in the imaged moving image on the second imaging date and time, and superposing the mask image in a position corresponding to the background image generated by background image generator 33. Accordingly, as shown in FIG. 11, the mask image is displayed on moving image display part 48 of the monitoring screen.

Herein, in the second exemplary embodiment, the mask images on different imaging dates and times are displayed at the same time, and the mask images on different imaging dates and times are superposed with each other, in some cases. In the second exemplary embodiment, as a display method of the mask images on different imaging dates and times, as shown in FIG. 11A, a normal display mode where the display is not performed based on the order of priority can be selected, and as shown in FIG. 11B, a priority display mode where the display is performed based on the order of priority can be selected.

As shown in FIG. 11A, in the normal display mode where the display is not performed based on the order of priority can be selected, the superposed part of the mask images on different dates and times are displayed to be discriminated from the part other than the mask images, that is, the parts not superposed with the mask images of the other persons. In the example shown in FIG. 11A, the superposed part of the mask image is displayed with an image obtained by synthesizing each mask image. For example, the part where a red mask image and a blue mask image are superposed with each other is displayed in purple, and the superposed parts of the mask images are displayed at transmittance obtained by adding transmittance of each mask image.

As shown in FIG. 11B, in the priority display mode in which the display is performed based on the order of priority, the parts where the mask images on different dates and times are superposed are displayed so that the mask image on the date and time having higher order of priority covers the mask image on the date and time having lower order of priority.

In the second exemplary embodiment as described above, since the mask images by the plurality of imaging dates and times, for example, today and yesterday are displayed, it is possible to simply grasp the imaging date and time of the person appearing on the moving image, and therefore, it is possible to efficiently perform the operation of grasping the action tendency of the person by the date and time. Herein, when the plurality of imaging dates and times are set as the same time points on different dates, it is possible to compare the action tendencies of the persons for each date, and when the plurality of imaging dates and times are set as the time zones in the morning and the evening of the same date, it is possible to compare the action tendencies of the persons for each time zone in morning and evening.

Third Exemplary Embodiment

Next, a third exemplary embodiment will be described. The points not particularly stated herein are the same as in the first exemplary embodiment.

Figure 12:
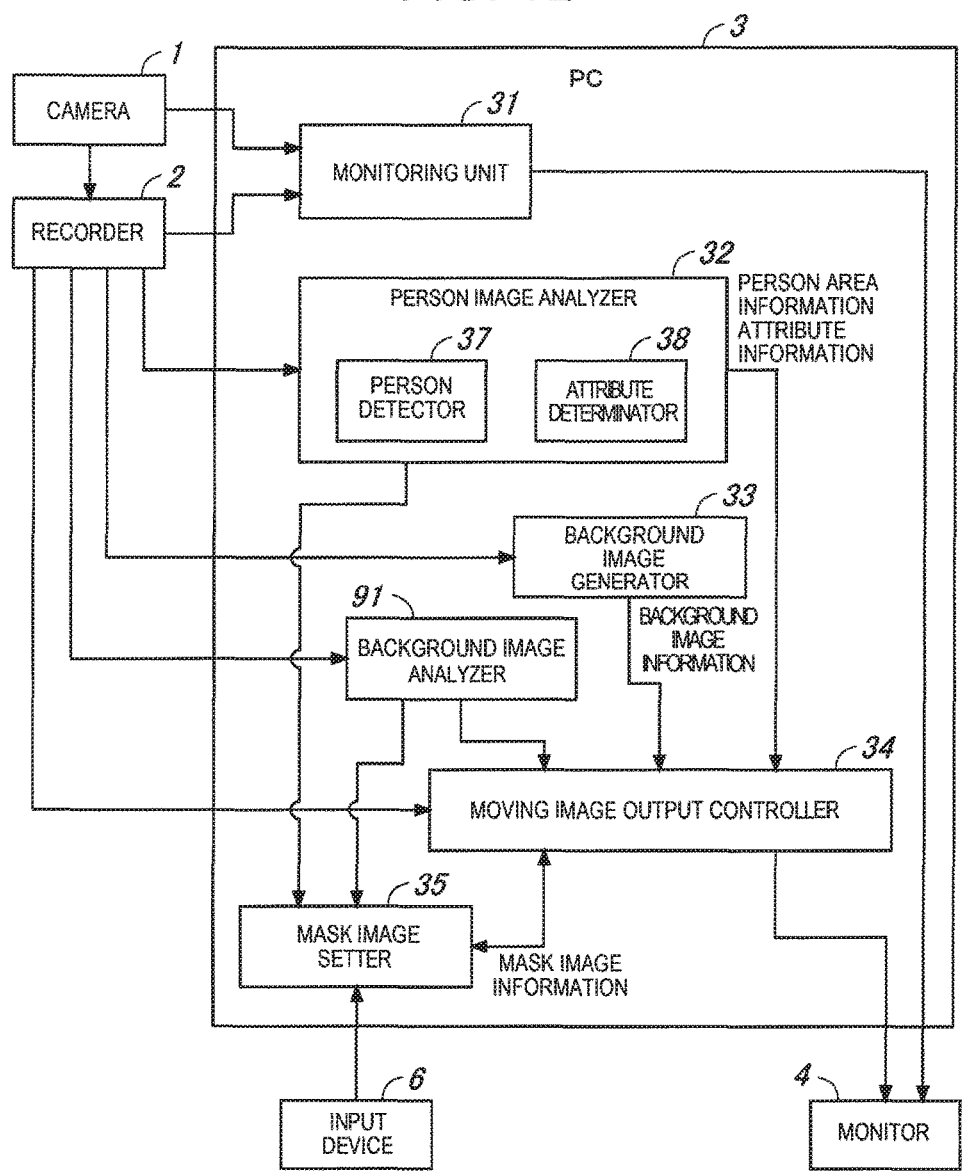
FIG. 12 is a functional block diagram showing a schematic configuration of PC 3 of a monitoring system according to a third exemplary embodiment.

FIG. 12 is a functional block diagram showing a schematic configuration of PC 3 of a monitoring system according to the third exemplary embodiment. In the third exemplary embodiment, in the same manner as in the first exemplary embodiment, PC 3 includes monitoring unit 31, person image analyzer 32, background image generator 33, moving image output controller 34, and mask image setter 35, and PC 3 in the third exemplary embodiment further includes background image analyzer 91.

Background image analyzer 91 performs a process of acquiring goods changing information regarding appearance and disappearance of the product in the image area of the background in the imaged moving image. In this background image analysis process, by comparing the plurality of background images obtained by removing the images of the persons (foreground images) from the imaged moving image, the changed states (appearance and disappearance) of the products are detected, and area information of the changed products (positional information regarding image area of product) is acquired.

Moving image output controller 34 performs a process of generating and outputting an output moving image displayed so as to discriminate the changes (appearance and disappearance) of the products in the image area of the background, based on the goods changing information output from background image analyzer 91. Herein, when the product disappears, the image area where the product has been present in the moving image before the disappearance may be changed to a translucent mask image, and when the product appears, the image area of the product may be highlighted.

Various appropriate methods may be used for highlighting when the product appears. For example, the outline of the image area of the product may be displayed, or when the product is small and it is difficult to recognize the product, an animation display such as blinking may be performed. When the product appears, the image area of the product may be changed to the translucent mask image, in the same manner as when the product disappears. Appropriate mark images, for example, images of signals such as O or X, may be displayed in the position of the changed (appearance or disappearance) product.

In the third exemplary embodiment, the changed situations (appearance and disappearance) of the products are displayed to be discriminated. Also, in the same manner as in the first exemplary embodiment, it is possible to display the mask image of the person by attribute, mask image setter 35 performs a process of setting a mask image according to an input operation by a user for selecting a mask image for each attribute of the person, attribute determinator 38 performs a process of determining attribute (gender, age, and the like) for each person detected from the imaged moving image, and moving image output controller 34 performs a process of generating and outputting an output moving image obtained by changing the image area of the person to a mask image by attribute.

Figure 13:
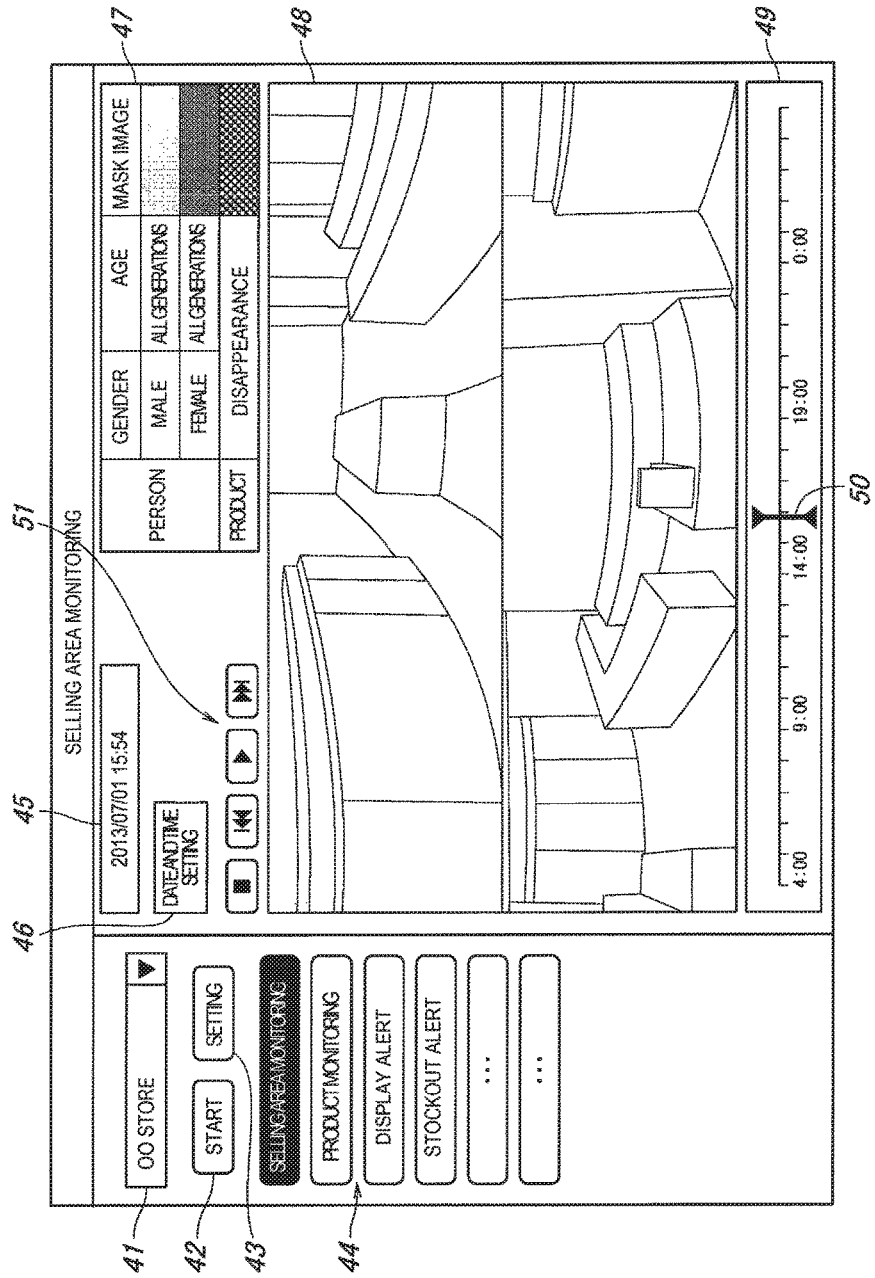
FIG. 13 is an explanatory diagram showing a monitoring screen displayed on monitor 4.

Next, a monitoring screen displayed on monitor 4 will be described. FIG. 13 is an explanatory diagram showing the monitoring screen displayed on monitor 4.

Even in the third exemplary embodiment, a monitoring screen having a configuration approximately similar to that of the first exemplary embodiment (see FIG. 4) is displayed on monitor 4, and in the monitoring screen, the mask image set by the attribute of the person and the mask image showing the disappeared product are displayed on explanatory note display part 47.

Figure 14:
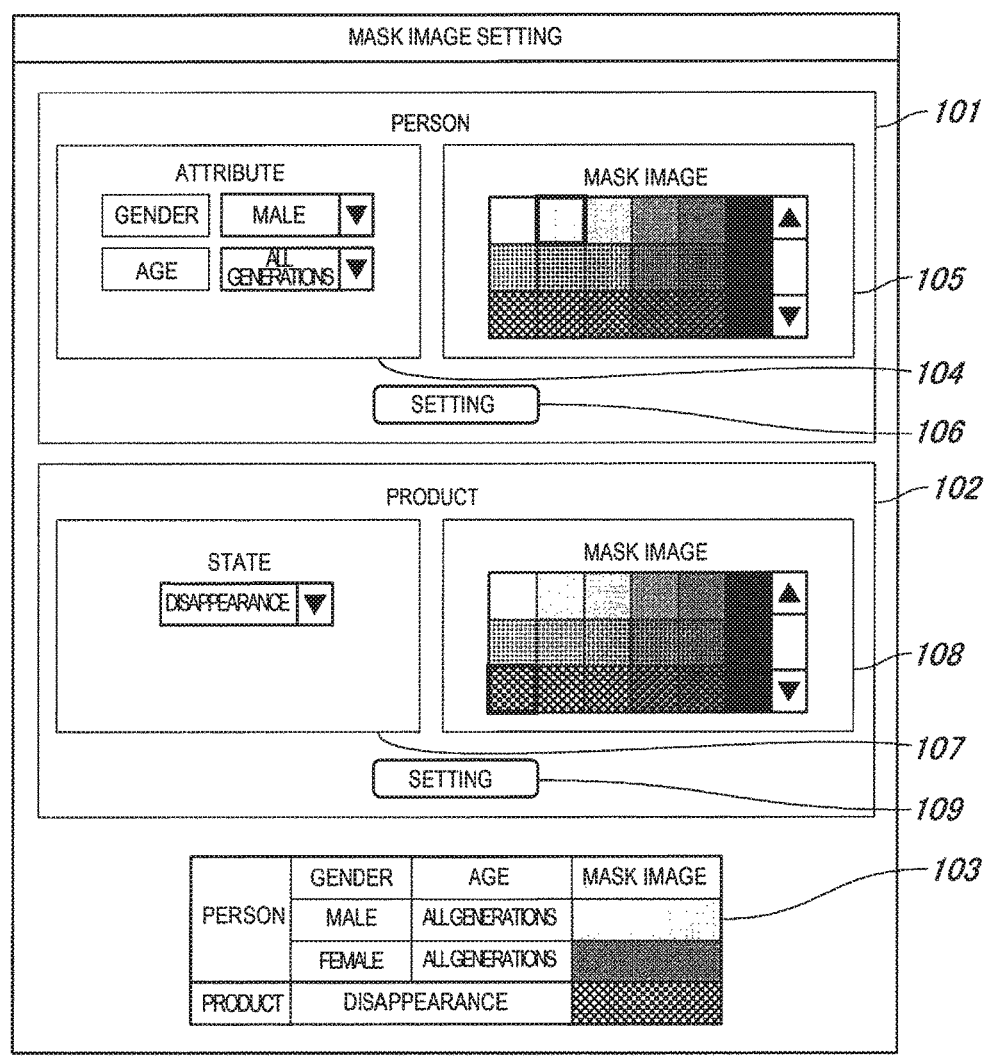
FIG. 14 is an explanatory diagram showing a mask image setting screen displayed on monitor 4.

Next, the operation of setting the mask images by the attribute of the person and the mask image of the changed states (appearance and disappearance) of the product will be described. FIG. 14 is an explanatory diagram showing a mask image setting screen displayed on monitor 4.

This mask image setting screen sets the mask images by the attributes of the person and sets the mask images of the changed states (appearance and disappearance) of the product. This mask image setting screen includes person setting part 101, product setting part 102, and set contents display part 103.

In the same manner as in the first exemplary embodiment (see FIG. 5), person setting part 101 includes person attribute selection part 104, mask image selection part 105, and setting button 106. When the attribute of the person (gender, age, and the like) is selected in person attribute selection part 104, the mask image corresponding to the attribute of the person is selected in mask image selection part 105, and setting button 106 is operated, the set contents, that is, the mask image by attributes, are displayed on set contents display part 103.

Product setting part 102 is provided with changed state selection part 107, mask image selection part 108, and setting button 109. A user selects the changed states (appearance and disappearance) from a pull-down menu in changed state selection part 107. A user selects the mask image corresponding to the changed state selected in changed state selection part 107 from a title menu in mask image selection part 108. When the changed state and the mask image corresponding thereto are selected in changed state selection part 107 and mask image selection part 108, and setting button 109 is operated, the set contents, that is, the mask image of the changed state of the product, are displayed in set contents display part 103.

Next, the outline of the process performed by moving image output controller 34 and the moving image displayed on moving image display part 48 of the monitoring screen shown in FIG. 13 will be described. FIGS. 15A, 15B, 16A, 16B, and 16C are explanatory diagrams showing main parts of moving image display part 48 of the monitoring screen shown in FIG. 13.

Figure 15A:
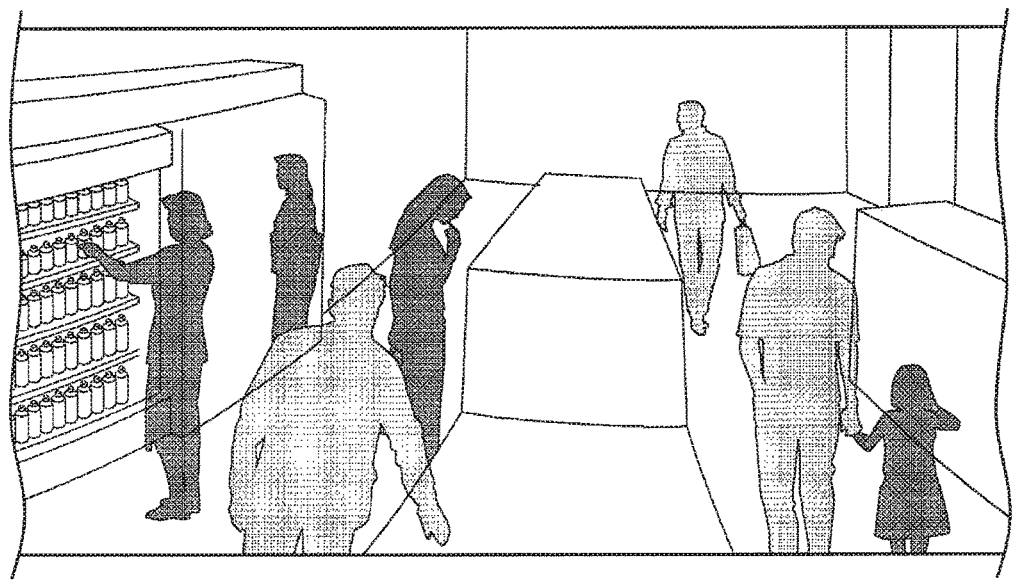
FIGS. 15A and 15B are explanatory diagrams showing main parts of moving image display part 48 of a monitoring screen.
Figure 15B:
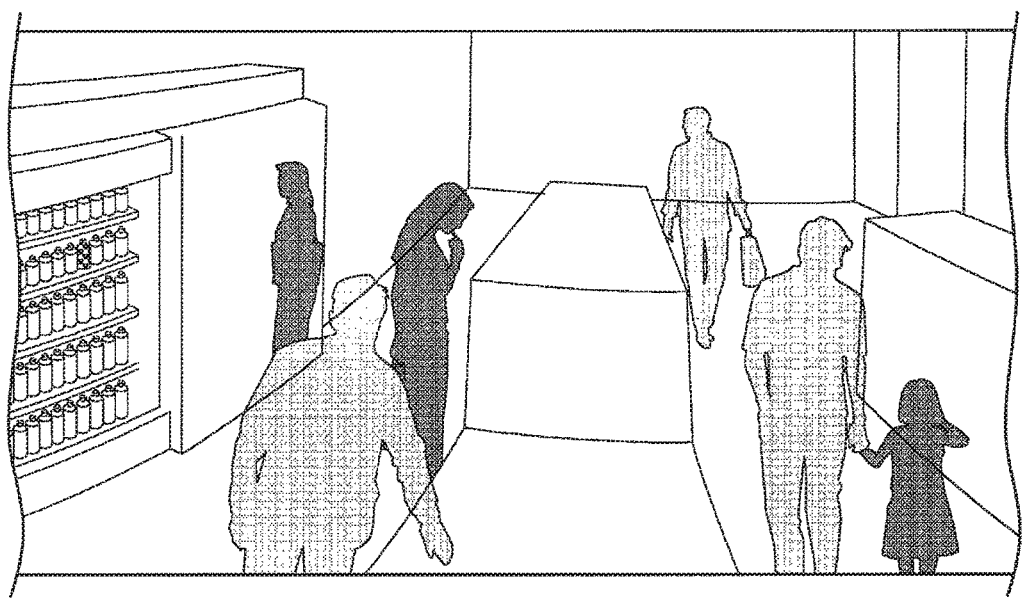

In the third exemplary embodiment, in the same manner as in the first exemplary embodiment (see FIG. 6A), the moving image imaged by camera 1 is displayed as it is in moving image display part 48 in the normal playback mode, and as shown in FIGS. 15A and 15B, the output moving image obtained by changing the image area of the person to the mask image is displayed in the mask playback mode after performing the mask image setting.

Figure 16A:
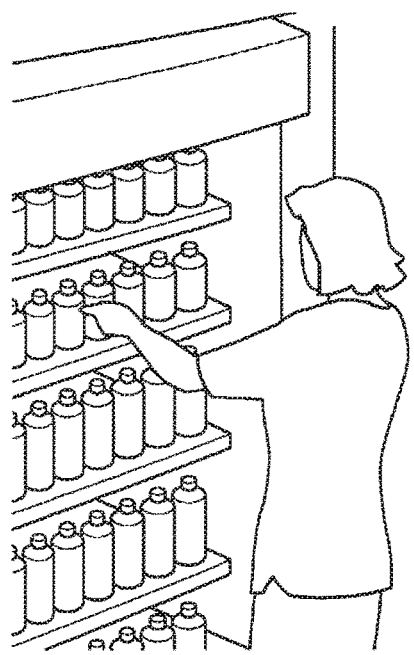
Figure 16B:
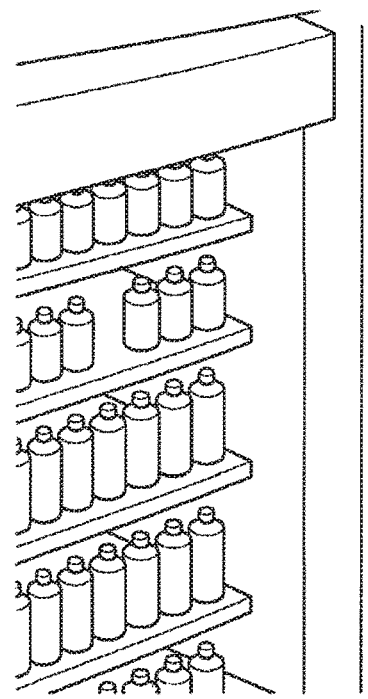

Herein, as shown in FIG. 16A, the customer in front of the display shelf carries the product away. As shown in FIG. 16B, when the product disappears from the display shelf, the disappearance of the product is detected by background image analyzer 91, and moving image output controller 34 performs a process of changing the image area of the disappeared product on the background image to the mask image. Accordingly, as shown in FIG. 16C, the mask image is displayed in a position where the product has been present, in the mask playback mode.

The display of the mask image or the highlighting showing the changed state (appearance and disappearance) of the product may be completed when the predetermined time has elapsed from the time point of the change (appearance and disappearance) of the product. In the same manner as that of the mask image of the person, the mask image of the product is obtained by generating the outline of the image area of the product from the area information of the product (positional information regarding image area of product) and covering the inside of the outline with a translucent image.

In the third exemplary embodiment as described above, since the mask images are displayed by the attributes, it is possible to simply grasp the attribute of the person appearing on the moving image, and therefore, it is possible to efficiently perform the operation of grasping the action tendency of the person for each attribute of the person. Since the display is performed so as to discriminate the change of the product (at least any one of appearance and disappearance), it is possible for a user to discriminate the changing products, and therefore, it is possible for a user to efficiently perform the operation of grasping the changed state of the product with the action of the person.

In the third exemplary embodiment, both the appearance and the disappearance of the product is detected and the output image displayed so as to discriminate both the appearance and the disappearance is generated, but at least any one of the appearance and the disappearance of the product may only be a target.

Figure 17:
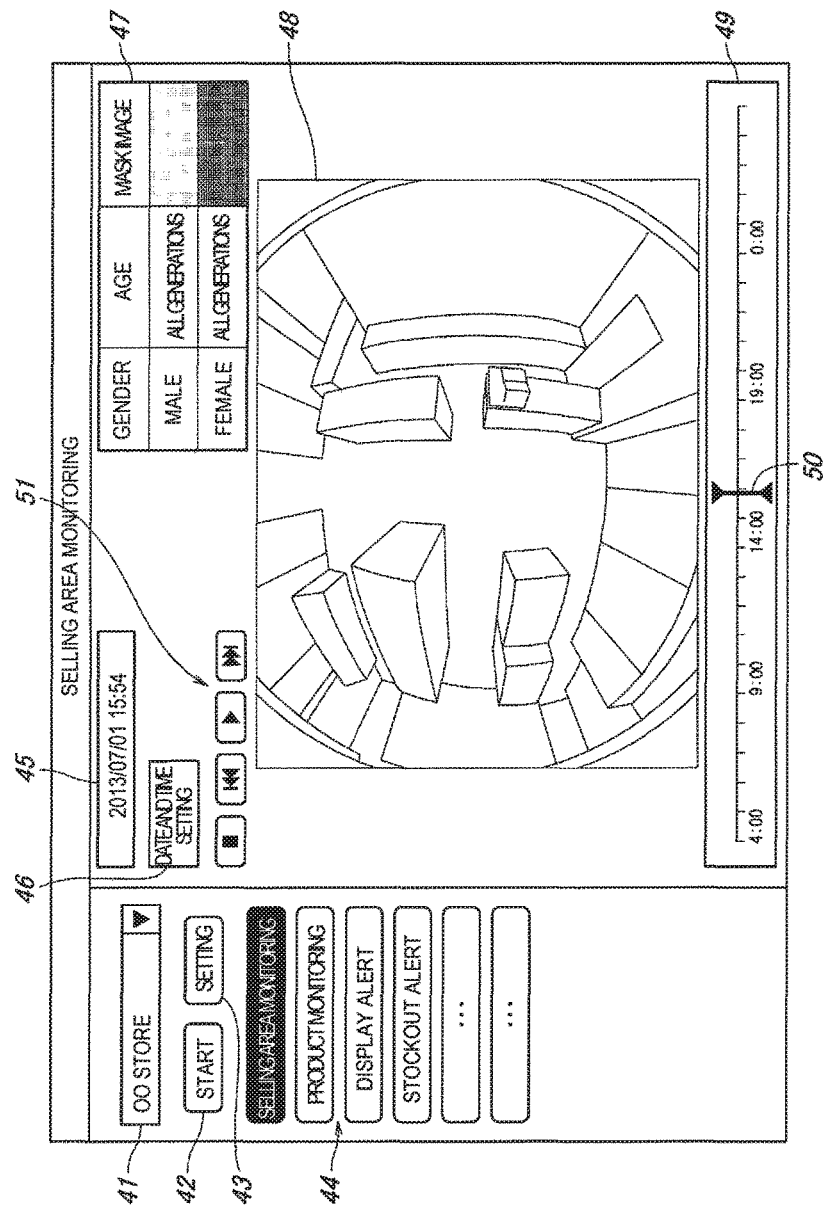
FIG. 17 is an explanatory diagram showing another example of a monitoring screen displayed on monitor 4.

FIG. 17 is an explanatory diagram showing another example of the monitoring screen displayed on monitor 4. In the examples described above, panoramic moving images imaged by camera 1 which is the omnidirectional camera, are displayed on moving image display part 48, but in an example shown in FIG. 17, the moving images imaged by camera 1 which is the omnidirectional camera, are displayed as they are.

Hereinabove, the invention has been described based on the specific embodiments, but the embodiments are merely examples, and the invention is not limited to the embodiments. Not all of constituent elements of the monitoring apparatus, the monitoring system, and the monitoring method according to the invention shown in the embodiments are necessary, and it is possible to appropriately remove and delete the constituent elements in a range of not departing from the scope of the invention.

For example, in the first to third exemplary embodiments, the example of a retail store such as a convenience store has been described, but there is no limitation to the retail store, and the invention can also be applied to a store with an operation format other than that of the retail store. In addition, it is possible to set a monitoring area other than the store as a target.

In the first to third exemplary embodiments, as shown in FIG. 2, camera 1 is set as the omnidirectional camera including an imaging range at 360 degrees using a fisheye lens, but a camera including a predetermined angle of view that is a so-called box camera can also be used.

In the first to third exemplary embodiments, the output moving image where the mask images for each person are superposed on the background image is generated, but the mask image can only be displayed without displaying the background image.

In the first to third exemplary embodiments, the necessary setting matters are input by selection from a pull-down menu or a title menu, but there is no limitation, and an appropriate input unit may be provided on the screen, and the selection may be performed with a radio button or a numerical value may be directly input.

In the first to third exemplary embodiments, various configurations having respective characteristics are described, but these configurations are not limited to the combination shown in each of the first to third exemplary embodiments, and the configurations shown in each of the first to third exemplary embodiments can be appropriately combined with each other.

In the first to third exemplary embodiments, the process necessary for the monitoring is performed by PC 3 provided in the store, but as shown in FIG. 1, the necessary process may be performed by PC 11 provided in the head office, or cloud computer 21 configuring a cloud computing system. The necessary process may be shared by a plurality of information processing apparatuses, and information may be transmitted to and received from the plurality of information processing apparatuses through a communication medium such as an IP network or a LAN. In this case, the monitoring system is configured with the plurality of information processing apparatuses sharing the necessary process.

In the configurations described above, among the processes necessary for the monitoring, at least a process having a large operation amount, for example, the person detection process, may be performed by PC3 provided in the store. By configuring as described above, since the amount of data of necessary information in the remaining processes is small, even when the remaining processes are caused to perform by an information processing apparatus installed in another place different from the store, for example, PC 11 installed in the head office, it is possible to decrease a communication load, and therefore, it is easy to operate the system by broad area network connection configuration.

Among the processes necessary for the monitoring, at least a process having a large operation amount, for example, the person detection process, may be performed by cloud computer 21. By configuring as described above, since an operation amount of the remaining process is small, a high-speed information processing apparatus is not necessary on the user side such as a store, and it is possible to reduce cost shouldered by a user.

Cloud computer 21 may perform all of the necessary processes or at least the moving image output control process among the necessary processes may be shared by the cloud computer 21. By configuring as described above, in addition to PC 3 and PC 11 provided in the store or the head office, it is also possible to display the moving image on a portable terminal such as smart phone 22 or tablet terminal 23, and therefore, it is possible to check the situations of the inside of the store in an arbitrary place such as places other than the store or the head office.

In the embodiment, PC 3 installed in the store performs the process necessary for the monitoring, and the monitoring screen or the mask image setting screen are displayed on monitor 4 of PC 3 to perform necessary input and output by PC 3, but the necessary input and output may be performed by an information processing apparatus other than the information processing apparatus which performs the process necessary for the monitoring, for example, PC 11 installed in the head office or a portable terminal such as tablet terminal 23.

Recently, a 4K television for achieving high image quality as a monitor has been developed, and by employing a camera corresponding to such a 4K television, it is possible to improve discrimination performance of a person. Even in an environment where there are a lot of persons, it is possible for a user to simply grasp the action tendencies of the person from a mask playback moving image.

The monitoring apparatus, and the moving image output method according to the invention have an effect of allowing a user to efficiently perform the operation of grasping the action tendencies of the person, and are useful as a monitoring apparatus, and a moving image output method which generate and output an output moving image obtained by changing an image area of a person detected from an imaged moving image of a monitoring area to a mask image.

What is claimed is:

1. A monitoring apparatus comprising:
   a processor,
   wherein the monitoring apparatus images a monitoring area and outputs a moving image of the monitoring area, and
   the processor
      detects persons appearing in the moving image, performs mask processing by changing inner portions of outlines of the persons into mask images based at least on information of the monitoring area, and superposes the mask images on a background image obtained by removing images of the persons, to generate a mask-processed moving image, and
      outputs the mask-processed moving image to a browsing apparatus through a network, wherein the background image at the inner portion of the mask is displayed through the mask.

2. The monitoring apparatus of claim 1,
   wherein the processor reproduces any moving image of the mask-processed moving image and the normal moving image which is not subjected to the mask processing, in accordance with a playback mode of the moving image set in the browsing apparatus.

3. The monitoring apparatus of claim 1,
   wherein the processor changes at least one of display elements of the mask image, such as a color, shading, a pattern, and an outline.

4. A moving image output method using a monitoring apparatus which images a monitoring area, performs a processing of a moving image of the monitoring area, and outputs the processed moving image, the method comprising:
   detecting persons appearing in the moving image, performing mask processing by changing inner portions of outlines of the persons into mask images based at least on information of the monitoring area, and superposing the mask images on a background image obtained by removing images of the persons, to generate a mask-processed moving image; and
   outputting the mask-processed moving image to a browsing apparatus through a network, wherein, wherein the background image at the inner portion of the mask is displayed through the mask.

5. A monitoring apparatus comprising:
   a processor,
   wherein the monitoring apparatus images a monitoring area and outputs a moving image of the monitoring area, and
   the processor
      detects persons appearing in the moving image, performs mask processing by changing inner portions of outlines of the persons into mask images based at least on attributes of each of the persons, and superposes the mask images on a background image obtained by removing images of the persons, to generate a mask-processed moving image, and
      outputs the mask-processed moving image to a browsing apparatus through a network, wherein the background image at the inner portion of the mask is displayed through the mask.

* * * * *